Nov. 12, 1940.　　　　G. P. LESSMANN　　　　2,221,593
MULTIPLE FAN DRIVE FOR FURNACES
Filed Oct. 18, 1938　　　2 Sheets-Sheet 1

WITNESSES:
Wm. B. Sellers
Bernard L. Zangwill

INVENTOR
Gerhard P. Lessmann.
BY O. B. Buchanan
ATTORNEY

Nov. 12, 1940.   G. P. LESSMANN   2,221,593
MULTIPLE FAN DRIVE FOR FURNACES
Filed Oct. 18, 1938   2 Sheets-Sheet 2
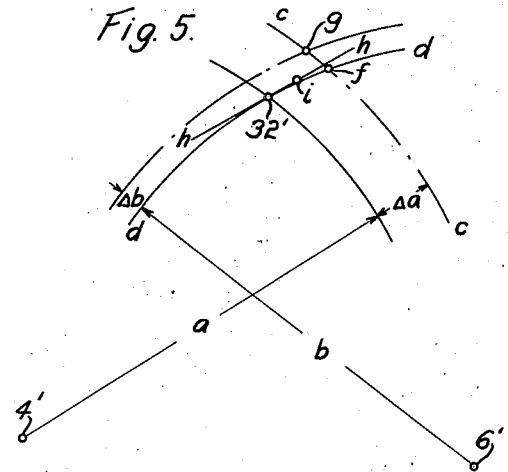
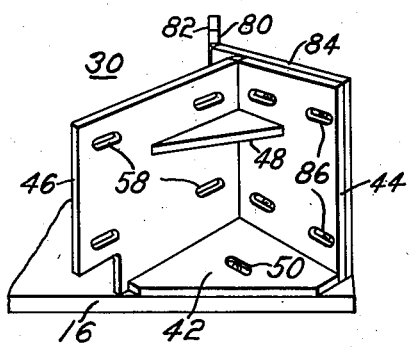
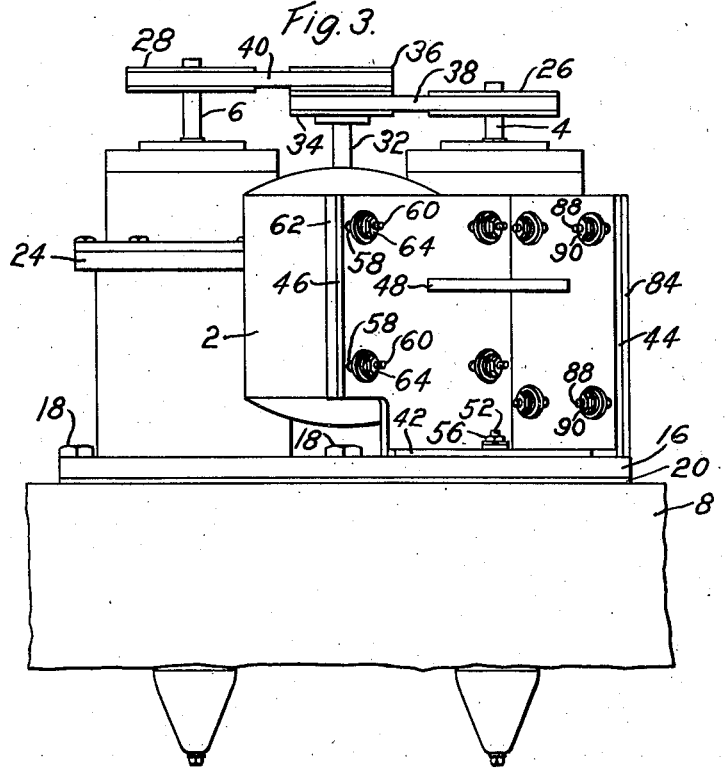
WITNESSES:
Wm. B. Sellers.
Bernard L. Zangwill
INVENTOR
Gerhard P. Lessmann.
BY O. B. Buchanan
ATTORNEY Patented Nov. 12, 1940

2,221,593

UNITED STATES PATENT OFFICE 2,221,593

MULTIPLE FAN DRIVE FOR FURNACES

Gerhard P. Lessmann, Wilkinsburg, Pa., assignor to Westinghouse Electric & Manufacturing Company, East Pittsburgh, Pa., a corporation of Pennsylvania Application October 18, 1938, Serial No. 235,606

10 Claims. (Cl. 74—242.12)

In some mechanical power transmission mechanisms for the driving of two shafts, limited space, or economy, or desirable engineering objectives dictate the use of a single motor as the source of mechanical power and separate, power-transmitting means of the endless type, such as belts or the like, for applying the power to each of the driven shafts. My invention relates to such power transmission in that it is directed to assuring proper, vibration-free transmission of power from the single motor to the two driven shafts.

In accordance with my invention, separate belts transmit the power of the motor shaft to each of the two driven shafts. All of the shafts are in spaced relation with respect to each other, but the two driven shafts are relatively fixed in position while the motor is capable of being secured in a position in which both belts have the requisite tension for satisfactory operation. However, since endless, power-transmitting means of the belt type are prone to stretch with continued use, and perhaps to unequal extents where two independent belts are employed as in this invention, provision must be made to take up the slack in both belts to the proper degree.

Tensioning devices such as, for example, idler pulleys at once suggest themselves for the purpose, and have been used extensively where the loss of energy to drive them, and vibration are not objectionable, but this expedient is unsatisfactory when the distance between the centers of the working shafts is small. Other devices are also known for directly but independently driving two shafts from a single motor by means of belts, but to my knowledge, they all involve floating parts which are obviously objectionable where a solid support and vibrationless and continuous transmission of power over short distances are required.

Accordingly, it is a broad object of my invention to combine in a system transmitting power from a single motor to a pair of driven shafts through the medium of short independent belts, means for securely supporting the motor.

It is another object of my invention to combine with a system for the transmission of power from a single motor to a pair of driven shafts through the medium of short independent belts, means for so supporting the motor that any slack in either or both belts can be easily and readily taken up.

It is a more complete purpose of my invention to provide in a system for the transmission of power from a single motor to a pair of driven shafts through the medium of short independent belts, means for rigidly supporting the motor including adjustable features for changing the position of the motor whereby the slack in either or both belts will be taken up, whatever the cause of the slack, and whether the slack be of equal or unequal amounts in both belts.

Other objects and novel features, elements or combinations of elements introduced by my invention will be apparent from the following description thereof, to be taken in conjunction with the drawings in which:

Fig. 3 is an elevational view of the structure of Fig. 1 looking at the motor side;

Fig. 4 is a perspective view of the motor supporting frame with its provisions for adjustment; and Fig. 5 is a geometrical layout for explaining the mode of operation of my invention.

Figure 1:
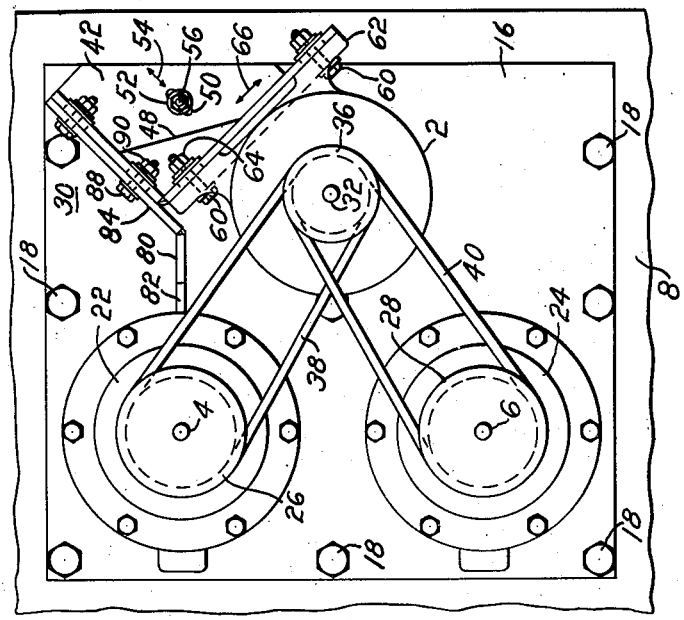
Figure 1 is a plan view of an embodiment of my invention including a motor, its supporting means, and two belt-connected shafts driven by the motor.

In my invention, electrical energy is converted by an electric motor 2 into mechanical power which is distributed to two separate loads by means including driven shafts 4 and 6 for each load. The particular mechanical load or loads attached to the driven shafts are, of course, of small consequence to my invention, and obviously any suitable load or loads can be attached to the driven shafts 4 and 6. However, as a single example of the universality of my invention, I have shown it applied to a structure for circulating a gaseous atmosphere within the heating chamber of a furnace. The furnace has not been shown in the drawings in its entirety but comprises a top wall having an outer sheet metal shell 8 spaced from an inner sheet metal shell 10 with heat insulation 12 interposed between them. Structural members 14 extend within the top wall for the purpose of suitably strengthening the wall as well as forming a secure foundation for the apparatus of my invention supported on the top of the furnace.

Figure 2:
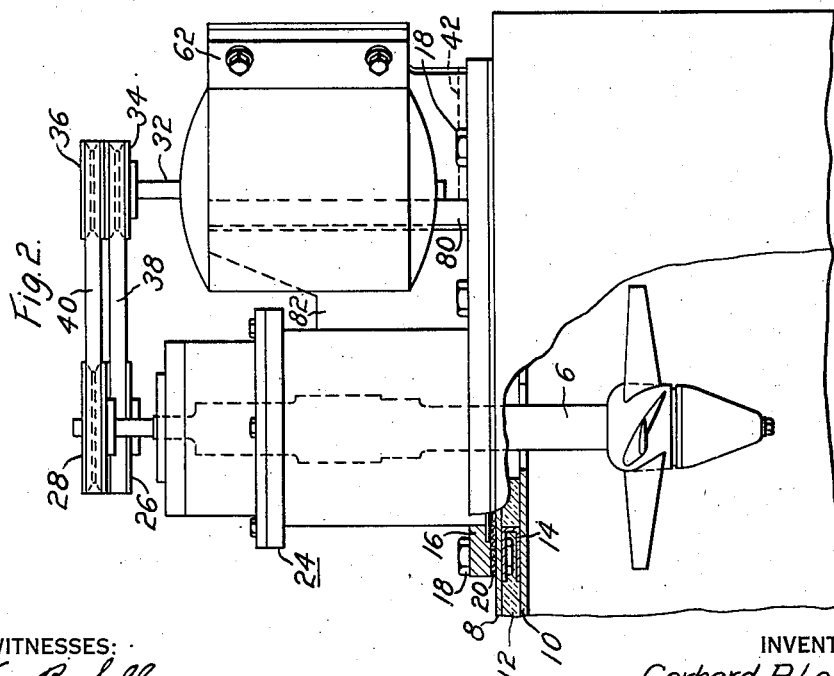
Fig. 2 is a side elevational view, partly in section, of the structure of Fig. 1.

The structural members may take any suitable form, as, for example, channels such as shown in Fig. 2, and are suitably interconnected in a framework to form a solid and rigid support for the apparatus secured to it, and which in this case includes a heavy metallic bed plate 16 suitably bolted at spaced intervals by bolts and nuts 18 to the structural members 14. If desired, an asbestos gasket such as 20 may be interposed between the bed plate 16 and the outer shell 8.

The shafts 4 and 6 pass through appropriate apertures formed in the bed plate 16 and the top wall of the furnace, being secured in position in spaced vertical position by suitable bearing housing 22 and 24 bolted to the bed plate 16. To the ends of the shafts 4 and 6 protruding into the furnace are attached fan propellers for the purpose of moving the atmosphere therein, while a pulley or sheave 26 is attached to the opposite end of the shaft 4 and a similar pulley or sheave 28 is attached to the outside end of the shaft 6.

The motor 2 is mounted on a frame, indicated in its entirety by the reference numeral 30, in such manner that the motor shaft 32 is substantially parallel to the shafts 4 and 6, and preferably somewhere near a perpendicular to a line of centers between the shafts 4 and 6. Pulleys or sheaves 34 and 36 are suitably secured to the motor shaft 32 to rotate therewith, and power is transmitted to the shaft 4 by means of an endless belt 38 riding over the sheaves 26 and 34, while power is transmitted from the shaft 32 to the shaft 36 by means of an endless belt 40 riding over the sheaves 28 and 36. I prefer to secure the respective cooperating sheaves in different planes so that there is no possibility of interference between the belts. For this purpose, the planes in which the sheaves 26 and 34 lie is somewhat below the planes in which the sheaves 28 and 36 lie. The sheaves have preferably V-shaped bearing surfaces which are engaged by correspondingly V-shaped belts, but I do not desire to be limited to this form of endless power transmitting means, since obviously any other appropriate expedient of similar character may be employed as, for example, flat belts riding on flat pulleys, or even sprocket and chain drives.

Because two separate belt power transmitting means are employed, it is necessary to mount the motor in such a manner as to assure that both belts will be under suitable tension for transmitting their proportionate parts of the load to their respective shafts. Where a motor shaft drives but a single shaft, it is sufficient to vary the distance between the driving and driven shafts to control the tension on the interconnecting belt. However, where a motor drives two shafts, changing the distance between the driving shaft and one of the driven shafts may have adverse effects upon the other power transmitting means. I have found, however, that by adjusting the position of the motor shaft in accordance with certain principles, I can adjust the tension in either or both belts to the proper degrees, and further can vary this adjustment to compensate for any subsequent stretching or shrinkage of one or both belts.

The principles underlying my invention can probably be best understood by reference to Fig. 5, in which the axis of the shaft 4 is represented by 4', and that of shaft 6 by 6'. These positions are fixed in accordance with my construction, and may be assumed to be, respectively, distance $a$ and $b$ from the point 32' representing the axis of the motor shaft. Let it be assumed now, that the belt 38 is too loose and that the distance between the centers of its sheaves must be increased an increment $\Delta a$ (shown exaggerated in Fig. 5 for clarity). Manifestly then, if the axis 32' were moved to any point on a circumference $c$—$c$ having as its radius $a+\Delta a$, the belt 38 will have the proper tension. However, there are theoretically only two points on this circumference at which the belt 40 would be tight. If we assume that the distance $b$ between the center of sheaves 28 and 36 is the proper distance for the requisite tension on the belt 40, any point on the arc $d$—$d$, drawn with $b$ as the radius, will be properly spaced from the axis 6' for the belt 40. The arcs $c$—$c$ and $d$—$d$ intersect as point $f$ and if the axis of the motor shaft is positioned to pass through this point both the belt 38 and the belt 40 will be tight, since the point $f$ lies on both the arc $c$—$c$, the locus of points for maintaining the belt 38 tight, and the arc $d$—$d$, the locus of points for maintaining the belt 40 tight. There will, of course, be a second point of intersection at the other extremity of the common chord of the extended circles including the arcs $c$—$c$ and $d$—$d$, but for practical purposes driving motors are not freely movable to such large extents, and the point $f$ only slightly displaced from 32' is the preferred point for locating the motor shaft under the conditions assumed.

As a further illustration of the principles underlying my invention, let it be assumed that originally the line of centers determined by 4' and 32' for belt 38, and between 6' and 32' for belt 40, was adequate to maintain the belts properly tensioned. If it is assumed now that for some reason or other belt 38 has elongated so as to require a new line of centers between the axes 4' and 32' equivalent to the distance $a+\Delta a$, and that the belt 40 has elongated to an extent to require a new line of centers between 6' and 32' equivalent to the distance $b+\Delta b$, then the intersection of the arcs drawn with their respective distances as radii will determine the proper position for the axis 32', and this is indicated at $g$, Fig. 5.

It may be observed, therefore, that any supporting means for the motor 2 must be such as to permit adjustment in any direction, and this is, of course, achieved by providing for adjustment along any two directions at an angle to each other, inasmuch as the components of movement along any two directions at an angle to each other can be such as to yield a single resultant in any direction of any desired finite length.

Accordingly, it is obvious, therefore, that if the motor is mounted on an adjustable support with two degrees of freedom of movement the belts 38 and 40 can be always maintained under proper tension by simple manipulation of the adjusting means whenever necessary. I prefer to construct the motor supporting means so that the motor will be adjustably but securely supported, and by securely I mean with a high degree of rigidity.

For the proper application to a furnace, the supporting frame 30 is admirably suitable as a mount for the motor, and comprises a base member or plate 42 having a right-angle corner and two upstanding side member plates 44 and 46 which abut each other and the base member 42 to form, in effect, a corner similar to a corner of a cube. The members 42, 44 and 46 are preferably welded, or otherwise secured, to form a rigid unitary construction, and a gusset plate 48, spaced from the base member 42, may be employed to further maintain the angle formed by the side members 44 and 46, and to strengthen the frame.

The frame 30 rests upon the bed plate 16 with its base member 42 flat against the latter. To permit adjustment of the frame in one component direction, the base member is preferably formed with an elongated slot 50 through which a bolt 52, secured in the base member 16, extends. By means of this bolt and the slot connection, the frame 30 can be adjusted either way on the bed plate 16 in a direction shown by the double-headed arrow 54 in Fig. 1. Suitable washers, lock washers and a nut 56 permit the loosening and tightening of the frame so that it may be adjusted and secured in position on the bed plate 16.

To provide a second degree of freedom of movement for adjusting the motor 2, the side plate 46 of the frame 30 is also provided with elongated slots 58 extending in a direction at right angles to the direction of the slot 50, although it is obvious that the corner angle of the base member 42 may be at an angle other than 90°, so that the slots 58 need not necessarily be in a direction at right angles to that of the slot 50. Bolts 60 extend through these slots 58 and serve to bolt the base feet 62 of the motor to the side plate 46 in an obvious manner. By loosening and tightening nuts 64 on the bolts 60, the motor can obviously be adjusted either way on the plate 46 in a direction shown by the double-headed arrow 66 of Fig. 1.

The plate 46 and base member 42 are in themselves sufficient to provide the adjusting means for the motor 2 which will enable both belts 38 and 40 to be tightened. The position of the motor can obviously be changed by the simple expedient of loosening the nuts 56 and the nuts 64 until the frame is free to slide on the base in the direction of the arrow 54, and the motor free to slide on the side plate 46 in the direction of the arrow 66. The belts 38 and 40 will automatically be tightened by simply pushing the motor 2 in a direction away from the shafts 6 and 4, since the motor 2 will slide on the plate 46 and the frame 30 will slide on the bed plate 16 in component directions sufficient to give a resultant which will be the intersection of two arcs similar to c—c and d—d of Fig. 5, and dependent upon the then length of the two belts.

However, to ensure a more rigid support for the motor, I prefer to weld or otherwise secure an upstanding angle member 80 to the bed plate 16. In this particular embodiment one side 82 of the angle member has an edge abutting the bearing housing 24 and may be welded or otherwise secured thereto, so that the angle will be solidly fixed in position. The other side 84 of the angle 80 has one of its surfaces parallel to and abutting the adjacent surface of the side plate 44 of the frame 30. By means of this construction the frame 30 can additionally be secured by means of slot and bolt fastening means comprising elongated slots 86 parallel to the slot 50 and the customary bolt and nut clamping means as comprising bolts 88 and nuts 90. Because of this added provision for securing the motor 2 rigidly in position, the adjustment thereof will now involve a loosening and subsequent tightening of the nuts 90 on the bolts 88 as well as loosening and subsequent tightening of the bolts 62 and nuts 64 on their respective bolts.

It may therefore be seen that in accordance with my invention I have provided a mount for the motor 2 which permits of adjustment of the motor shaft 32 in two degrees of freedom of movement which are at an angle to each other and therefore can serve to position the motor shaft at any point necessary, this point being substantially at the intersection of the two arcs whose radii are the distances required between one of the driven shafts and the motor shaft on the one hand, and the other driven shaft and the motor shaft on the other hand, for maintaining the belts 38 and 40 in proper tension.

Under some circumstances, as where one load is to be disconnected at times, it may be desirable to position one or both of the plates 46 and 48 with its plane substantially parallel to a tangent to an arc through the motor shaft and having a radius the line of centers $a$ or $b$ (Fig. 5) as the case may be. The advantage of such a disposition of a plate of the frame 30 can be best described with special reference again to Fig. 5 where line $h—h$ is tangent to arc $d—d$ at 32'. If the plane of plate 46 is parallel to this line, the motor can be adjusted for small distances along the plate without material change in the distance between 6' and 32' and therefore of the belt 40, but with considerable change in the distance between 4' and 32' and therefore of the belt 38. Thus, the distance between 6' and $i$ is substantially the same as between 6' and 32', but the distance from 4' to 32', now represented by the distance between 4' and $i$, has been considerably increased. This permits of slight adjustments of one belt without much effect on the other.

While I have shown my invention in the form which I now believe to be the best mode of application thereof, it is obvious that many changes may be made within the spirit and scope of the novel system which I have introduced. It is desired, therefore, that the appended claims be given the broadest construction and limited by the prior art.

I claim as my invention:

1. In the mechanical transmission of power by short independent belts, the combination of two driven shafts, a motor including a shaft, the said shafts being spaced and substantially parallel, and separate endless power-transmitting means connecting said motor shaft with said driven shafts, and a mounting rigidly supporting said motor and adjustable to position the said motor shaft substantially at an intersection of any two circles having the said driven shafts as centers, and of radii determined by their cooperating belts.

2. In the mechanical transmission of power by independent belts, the combination of two driven shafts, a motor including a shaft, the said shafts being spaced and substantially parallel, and separate endless power-transmitting means connecting said motor shaft with said driven shafts, a secured support, and means for adjustably but rigidly fastening said motor to said support whereby said motor shaft can be positioned at an intersection of any two circles having the said driven shafts as centers, and of radii determined by their driving belts.

3. In the mechanical transmission of power by short independent belts, the combination of two driven shafts, a motor including a shaft, the said shafts being spaced and substantially parallel, supporting base feet on said motor, means for rigidly securing said feet with adjustability substantially parallel to a tangent at the motor shaft of an arc having a radius substantially equal to a line of centers between one of said driven shafts and the said motor shaft, and having its center approximately at said one driven shaft, and further means for securing the last said means adjustably at an angle to said tangent.

4. In the mechanical transmission of power by independent belts, the combination of two driven shafts, a motor including a shaft, the said shafts being spaced and substantially parallel, and separate endless power-transmitting means connecting said motor shaft with said driven shafts, supporting base feet on said motor, an angular member, said feet and angular member having provisions for adjustably and rigidly securing said motor on one side of said angular member, and means for adjustably and rigidly securing said angular members to a solid support.

5. The structure of claim 4 with gusset means for strengthening said angular members.

6. For the mechanical transmission of power by independent belts, the combination of two driven shafts, a sheave on each of said shafts, a motor including a shaft, a pair of sheaves in effect, on said motor shaft, the said shafts being spaced and substantially parallel, a belt strapping the said sheave of one of said driven shafts, and one sheave of the motor, a second belt strapping the said sheave of the other of said driven shafts and the other sheave of the motor, a supporting frame, means for rigidly mounting said motor on said supporting frame with adjustability in one component direction, and means rigidly securing said frame to a base but adjustably in another component direction.

7. An adjustable supporting means for a motor comprising, an integral corner-shaped frame having a bottom member and two side plates at an angle, bolt and slot means for adjustably securing said motor to one of said side plates, means for adjustably securing said frame on a base, including bottom and slot means for said bolt member, the first adjustability being at an angle to the last.

8. The structure of claim 7 including a gusset between said side members.

9. For the mechanical transmission of power by short independent belts, the combination of two fixed driven shafts and a motor including a driving shaft, the said shafts being spaced and substantially parallel, separate endless power transmitting means connecting said motor shaft with said driven shafts, means for rigidly supporting said motor with its shaft substantially in a plane perpendicular to a line joining the said driven shafts, said means supporting said motor with provisions for adjustment in two different component directions in a plane perpendicular to said shafts, the said provisions for adjustment being such that one component direction is substantially parallel to a tangent to a circle having a radius which is substantially the distance between the said motor shaft and one of said driven shafts.

10. For the mechanical transmission of power by independent belts, the combination of two driven shafts, a sheave, in effect, on each of said shafts, a motor including a shaft, a pair of sheaves, in effect, on said motor shaft, the said shafts being spaced and substantially parallel, an endless power transmitting means strapping the said sheave of one of said driven shafts, and one sheave of the motor, a second endless power-transmitting means strapping the said sheave of the other of said driven shafts and the other sheave of the motor, an adjustable supporting means for a motor comprising, an integral motor-supporting frame having a bottom member and an upstanding side plate, bolt and slot means for adjustably securing said motor to one of said side plates, means for adjustably securing said frame on a base, including bolt and slot means for said bottom member, the first adjustability being at an angle to the last.

GERHARD P. LESSMANN.